United States Patent
Thorvaldsson et al.

(10) Patent No.: US 6,898,482 B2
(45) Date of Patent: May 24, 2005

(54) PROCESS AND AN APPLICATION FOR ITEM PROCESSING

(75) Inventors: Bjorn Thorvaldsson, Mosfellsbaer (IS); Haraldur Gudlaugsson, Kopavogur (IS); Petur Gudjonsson, Reykjavik (IS); Magnus Rognvaldsson, Reykjavik (IS)

(73) Assignee: Marel hf., Gardabae (IS)

( * ) Notice: Subject to any disclaimer, the term of this patent is extended or adjusted under 35 U.S.C. 154(b) by 0 days.

(21) Appl. No.: 10/466,080

(22) PCT Filed: Jan. 11, 2002

(86) PCT No.: PCT/IS02/00001

§ 371 (c)(1),
(2), (4) Date: Dec. 17, 2003

(87) PCT Pub. No.: WO02/054876

PCT Pub. Date: Jul. 18, 2002

(65) Prior Publication Data

US 2004/0082291 A1 Apr. 29, 2004

Related U.S. Application Data

(60) Provisional application No. 60/260,888, filed on Jan. 12, 2001.

(30) Foreign Application Priority Data

Jan. 12, 2001 (IS) .................................................. 5811

(51) Int. Cl.[7] .............................................. G06F 7/00
(52) U.S. Cl. ...................... 700/213; 700/108; 700/109; 700/115; 452/150
(58) Field of Search ................................. 700/213, 108, 700/109, 115, 116, 117; 452/150

(56) References Cited

U.S. PATENT DOCUMENTS

| | | | |
|---|---|---|---|
| 3,736,409 A | | 5/1973 | Boyan |
| 4,597,495 A | * | 7/1986 | Knosby ....................... 209/3.3 |
| 5,478,990 A | * | 12/1995 | Montanari et al. .......... 235/375 |
| 5,842,181 A | | 11/1998 | Fanjoy |
| 6,104,966 A | * | 8/2000 | Haagensen ................... 700/116 |
| 6,148,249 A | * | 11/2000 | Newman ..................... 700/225 |
| 6,151,866 A | * | 11/2000 | Connell ........................ 53/443 |
| 6,267,661 B1 | * | 7/2001 | Melville ..................... 452/157 |
| 6,546,304 B2 | * | 4/2003 | Thorvaldsson et al. ..... 700/115 |

FOREIGN PATENT DOCUMENTS

| DE | 739656 C | 10/1943 |
|---|---|---|
| EP | 0425407 A2 | 5/1991 |
| EP | 0489984 A1 | 6/1992 |

* cited by examiner

Primary Examiner—Khoi H. Tran
(74) Attorney, Agent, or Firm—Nixon & Vanderhye PC

(57) ABSTRACT

The present invention relates to integrated processing and information handling method for poultry items. As the poultry items are conveyed they are assigned to a processing station where they are processed and thereafter assigned to a predetermined collecting bins, which is connected to a computer system. The information related to the number, the weight and the quality of poultry segments are registered and also the processing time. This information is important not only for the operators but also for the control and management where the status of each processing line can be monitored and refined.

22 Claims, 18 Drawing Sheets

Line details

Activity: Tray Pack Tender Out

Pr.Period :: 227 (28/09/2000 15:20-28/09/2000 20:27)

Figure 1:
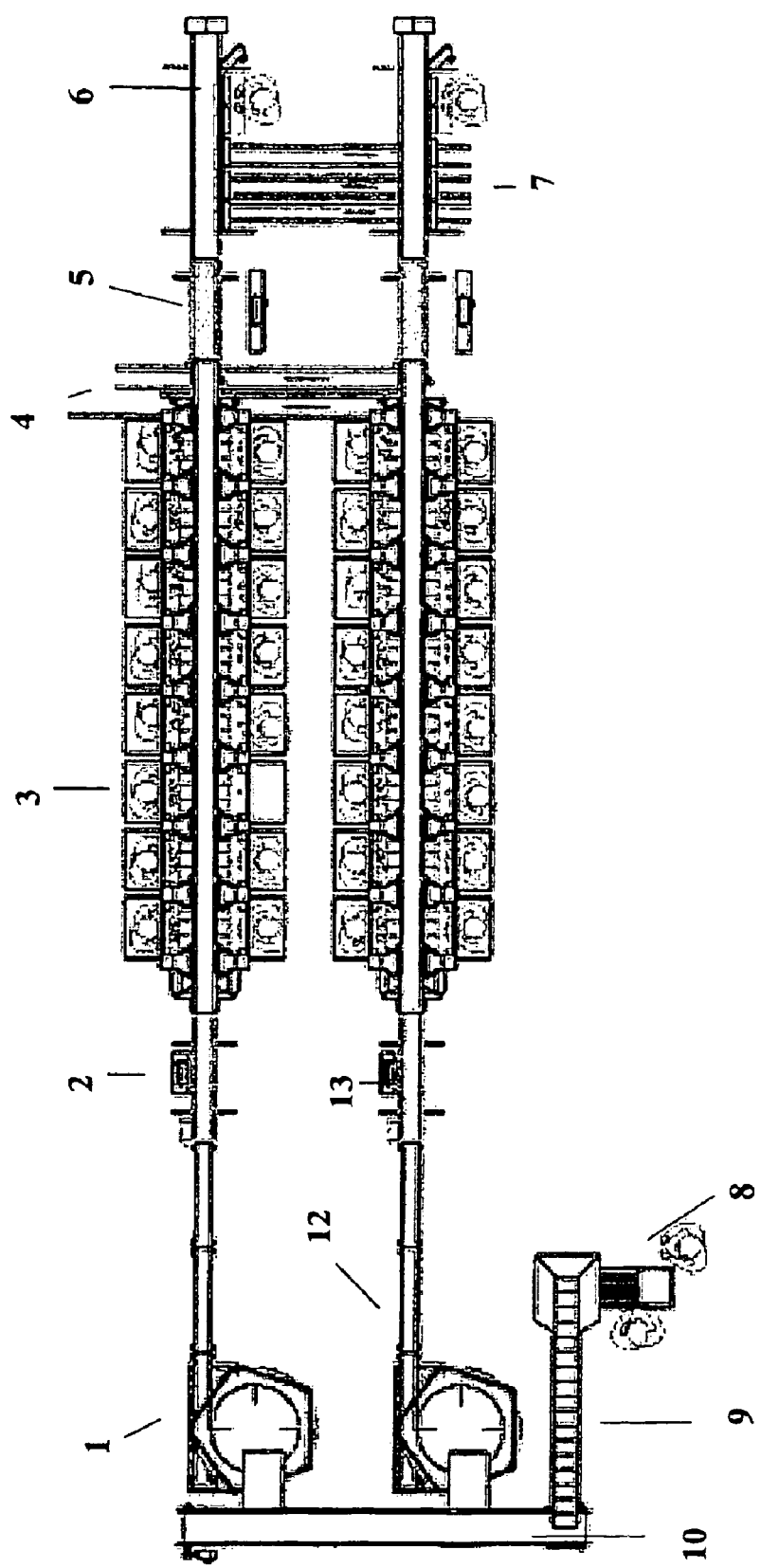

| Employee | Avr.weight(b) | Pieces | hpd(lb) | Primary(b) | Second(b) | Trimmings(b) | Hours | Defects | P.Yield | O-Yield | b/hour | Pieces/min |
|---|---|---|---|---|---|---|---|---|---|---|---|---|
| 27 Noum Leuy-87072 | 1,907 | 494 | 942.2 | 448.7 | 189.1 | 307.6 | 3.5 | 0.00 | 47.6 % | 67.4 % | 182.2 | 2.4 |
| 28 Sandra Blaine Garrett 85111 | 1,929 | 460 | 887.2 | 429.6 | 184.1 | 274.5 | 3.5 | 0.00 | 49.3 % | 69.1 % | 176.2 | 2.2 |
| 30 Chonchit Sisouvanh-83955 | 1,900 | 501 | 951.8 | 460.4 | 169.3 | 304.0 | 3.4 | 0.00 | 47.3 % | 68.0 % | 199.8 | 2.4 |
| 31 Domingo Sanchez-89136 | 1,903 | 539 | 1,025.5 | 490.8 | 205.2 | 329.6 | 3.5 | 0.00 | 47.9 % | 67.9 % | 200.2 | 2.6 |
| 32 Jos é Lopez-86079 | 1,873 | 677 | 1,267.9 | 612.0 | 238.5 | 417.4 | 3.5 | 0.00 | 48.3 % | 67.1 % | 244.1 | 3.2 |
| 33 Guadalupe Castro-87008 | 1,627 | 422 | 774.8 | 364.7 | 150.3 | 259.8 | 3.4 | 0.00 | 47.1 % | 66.5 % | 453.6 | 2.0 |
| 34 Paciano Padilla-86559 | 1,904 | 430 | 833.1 | 426.3 | 205.4 | 301.5 | 3.4 | 0.00 | 45.7 % | 67.7 % | 163.9 | 2.0 |
| 35 Orisida Godinez-91827 | 1,913 | 445 | 851.4 | 399.4 | 177.5 | 274.5 | 3.4 | 0.00 | 46.9 % | 67.8 % | 167.2 | 2.4 |
| 36 Carlos Montes-91830 | 1,869 | 527 | 1,000.7 | 473.9 | 172.8 | 354.3 | 3.4 | 0.00 | 47.4 % | 64.0 % | 198.5 | 2.1 |
| 37 Jes us Morales-91835 | 1,913 | 599 | 1,145.0 | 573.3 | 219.5 | 355.2 | 3.1 | 0.00 | 50.0 % | 68.9 % | 233.0 | 2.0 |
| 38 Reynaldo Rivera-91832 | 1,901 | 521 | 960.3 | 470.2 | 194.8 | 310.3 | 3.4 | 0.00 | 49.1 % | 67.8 % | 194.9 | 3.2 |
| 39 Elizabeth Ruiz Reyes-91831 | 1,823 | 428 | 823.0 | 420.4 | 147.0 | 255.8 | 3.5 | 0.00 | 51.1 % | 68.0 % | 162.0 | 2.5 |
| 41 Pablo Zamora-91882 | 1,882 | 360 | 943.3 | 439.6 | 183.3 | 273.4 | 3.4 | 0.00 | 48.0 % | 67.6 % | 199.1 | 2.0 |
| 42 Antonio Silva-Garcia-82339 | 1,935 | 421 | 735.1 | 369.1 | 153.9 | 223.2 | 3.3 | 0.00 | 49.7 % | 69.8 % | 154.8 | 2.2 |
| 43 Rogelio Parra-Siva-82520 | 1,866 | 421 | 785.7 | 363.9 | 162.4 | 259.4 | 3.3 | 0.00 | 48.3 % | 67.0 % | 159.4 | 1.9 |
| 44 Mariano Gutierrez-82602 | 1,894 | 554 | 1,044.0 | 475.9 | 211.8 | 356.3 | 3.5 | 0.00 | 45.6 % | 65.8 % | 197.5 | 2.1 |
| 46 Florencio Garcia-82911 | 1,918 | 553 | 1,030.0 | 487.4 | 223.2 | 340.0 | 3.5 | 0.00 | 46.6 % | 67.8 % | 208.5 | 2.7 |
| 47 Zeferino Garcia-84906 | 1,917 | 457 | 895.3 | 430.5 | 162.2 | 312.5 | 3.5 | 0.00 | 44.7 % | 65.1 % | 169.3 | 2.7 |
| 48 Darcy Berry-87073 | 1,923 | 499 | 969.7 | 455.9 | 189.3 | 307.5 | 3.5 | 0.00 | 47.5 % | 68.0 % | 167.8 | 2.2 |
| 49 Lee Banhthvong-82778 | 1,912 | 443 | 852.9 | 390.2 | 176.2 | 266.2 | 3.5 | 0.00 | 48.8 % | 65.3 % | 168.8 | 2.4 |
| 50 Tuan Ngoc Nguyen-82678 | 1,917 | 502 | 962.8 | 509.6 | 189.7 | 294.4 | 3.4 | 0.00 | 52.9 % | 70.5 % | 198.3 | 2.1 |
| 102 Uieu Kim Lien-82681 | 1,948 | 380 | 739.5 | 314.8 | 144.3 | 280.4 | 3.5 | 0.00 | 42.8 % | 62.1 % | 131.5 | 2.4 |
| 103 Jesus Salazar-82773 | 1,937 | 275 | 532.8 | 249.4 | 107.9 | 175.5 | 3.5 | 0.00 | 46.8 % | 67.1 % | 102.5 | 1.8 |
| Total: | 1,909 | 1004 | 21,002.0 | 9,973.7 | 4,164.3 | 6,663.9 | 78.8 | | 47.5 % | 67.3 % | 179.3 | 2.3 |

Fig. 8 e

PROCESS AND AN APPLICATION FOR ITEM PROCESSING

This application is claiming priority from a U.S. Provisional Patent Application.

This application is the U.S. national phase of international application PCT/IS02/0001 filed 11 Jan. 2002, which designated the U.S.

This application claims the benefit of Provisional Application Ser. No. 60/260,888, filed Jan. 12, 2001.

FIELD OF THE INVENTION

This invention relates to an integrated processing and information handling method for poultry items being conveyed by conveying means, where operators process the whole poultry item instead of specialising in only one part of the poultry item.

DESCRIPTION OF THE PRIOR ART

One thing that characterises food processing is the nature of the material to be processed. The material typically results in irregularities in size, shape and weight as the material is conveyed through the processing system, which can result in difficulties in automatically processing the material.

Methods have been developed in automatically processing poultry items. Beside automatically processing poultry items, the frequently used method is to manually process the poultry items as they are being conveyed through the processing system. In this system, the poultry items are conveyed serially, wherein one operator specialises in processing on particular part of the poultry item.

The problem with the automatically processing method is that it has the tendency of processing the poultry items inaccurately and even destroy parts of them. This often calls for increment in man power to process the parts delivered from the machine until the quality of the process fulfils the requirement made by the customer. On the other hand, the problem with the manually processing method is of other nature. Due to the serially conveying system, the processing line can be slowed down when one operator is slower than the other one. Beside that, the result in such a homogeneous working process can lead to increased rate in injury in the wrist. Furthermore, both these methods lack information-handling method for production, which can lead to higher quality of the process.

GENERAL DESCRIPTION OF THE INVENTION

It is an object of the present invention to increase the processing speed and to minimise the injury rate of the operators, wherein the operators process the whole poultry item instead of specialising in only one part of the poultry item. Furthermore, the present invention relates to an information handling method for the production, where information related to the number and the quality of the processed items can be monitored, both from the manager site and also from the operator site and wherein premium payment can easily be integrated into the salary system.

According to the first aspect the present invention relates to an integrated processing and information handling method for poultry items being conveyed by conveying means in a sequence, the method comprising the steps of:

assigning the conveyed poultry items to at least one processing station and transferring the assigned poultry items from the conveying means to the corresponding processing station, segmenting the poultry item and assigning the poultry segments to predetermined collecting bins depending on a type of poultry segment, obtaining information related to the poultry items or to the segments of poultry items and storing the information in a computer system, based upon a predefined criteria, transferring the content of the bins to the conveying means, and tracking the position of the poultry segments to the processing station by using the information based on assigning the poultry item to the processing station.

The assignment to the processing stations can be based on information related to how many poultry items have been assigned to the processing station and how many of them have been processed. The assignment can also proceed as long as the processing station can receive poultry items. When the station is too loaded with poultry items, the gate of the processing station could be blocked to prevent further assignment of them. The blocking could also be accomplished by means of using sensors that sense when the gate is not in its rest position.

At the processing station the poultry items could be processed until they exists as for example wings, legs and breast or the processing could comprise to halve the poultry items. The processed poultry items are assigned to at least one collecting bin. Preferably the assignment is based on sorting the same part from the processed poultry item to the same bin. Counters and a scales can easily be placed in the bins to monitor the number and the weight of the individual items, wherein the result can be directed to a computer system with it is stored and associated to the operator. The weighing procedure of the poultry items could also be accomplished by means of weighing the poultry items before entering the processing station at in-weighing station and again when it leaves the processing station at out-weighing station. The association of the items to the operator is done through the registration of the operator to the processing station, wherein the operator before starting the process has to be registered and wherein the registration is send to the computer systems that identifies the operator. The information from the bins can be used for example to calculate the salary for a given period time, the bonus can be integrated into the salary, and the efficiency of the operator with other period of times can be compared. This is not only important for the management where the status of each processing line can be monitored and refined but also for the operators. The operator will also be able to monitor how much he has processed in a given time interval, i.e. number of items and the total weight that he has processed. The computer system can supply him with information regarding the process or the information from the bins or the bins can directly be connected to a computer that the operator is provided with.

The bins for one processing station can be emptied simultaneously in one portion on a removing conveyor, which can be a part of the feeding conveyor or as an independent unit, for removing the poultry segments in a sequence from the processing station. The emptying of the bins at the processing stations can be based on emptying them at a fixed frequency. This ensures that the portions from the processing stations are in a sequence. Another criterion for the emptying the bins can be based on criterion such as the weight of the processed products in the bins or the number of processed products in the bins, wherein the time of emptying the bins has to be right. The emptying should not coincide with other portions from other processing stations. Therefore, for example from the speed of the conveyor and the time of when other bins were emptied, the suitable time should be chosen. The processed product on the removing conveyor can therefore be related to a processing station. This is important for further process, wherein the portion can be chosen for a quality control. The quality control can be based on analysing how well the product are processed, i.e. miscuts, bones, cartliage etc. The information regarding the quality of the poultry segments could be given to the computer system as an additional factor for the quality control, which the operator could have an access to.

A further aspect of the present invention is to provide a system for processing conveyed poultry items wherein the system comprises:

means for assigning the conveyed poultry items to at least one processing station and transferring the assigned poultry items from the conveying means to the corresponding processing station where the poultry items is processed, and means for obtaining information related to the poultry item or to the segments of poultry segment and storing the information in a computer system.

DETAILED DESCRIPTION OF THE INVENTION

Figure 2:
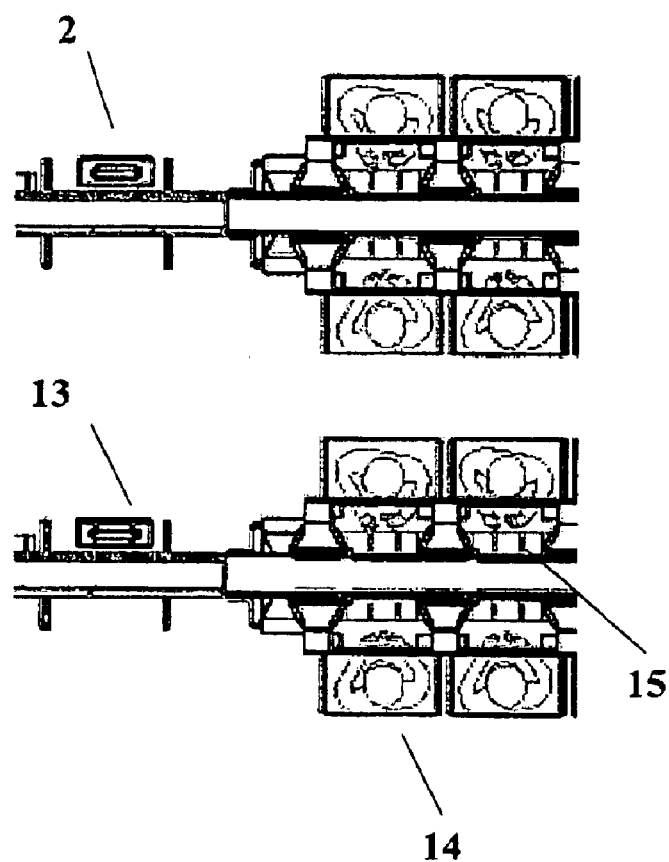
Figure 3:
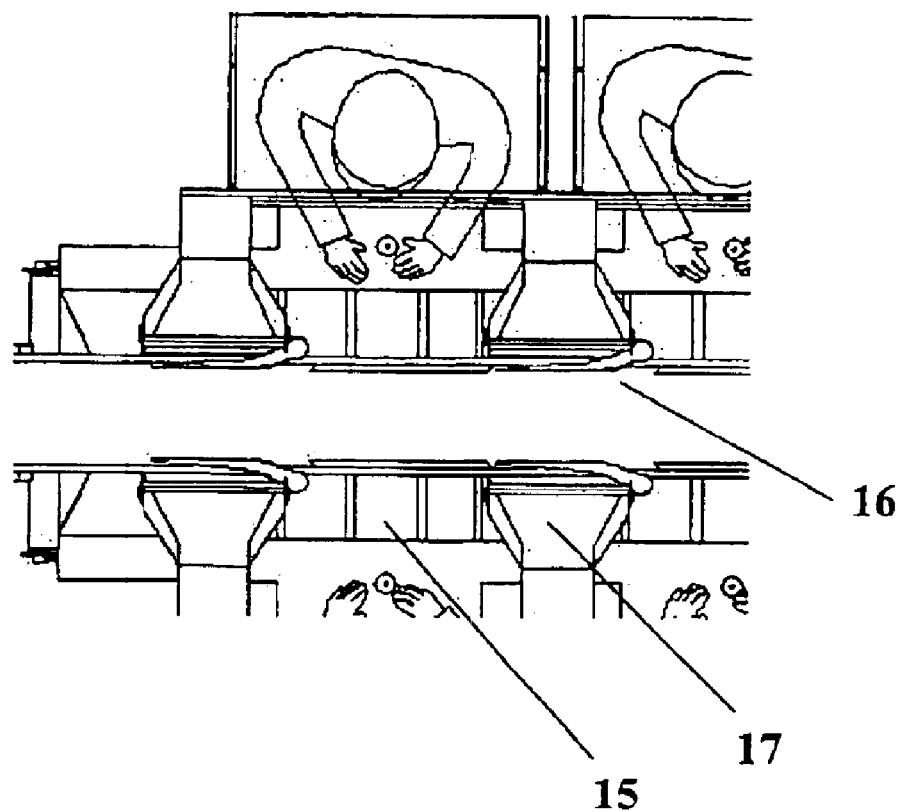
Figure 4:
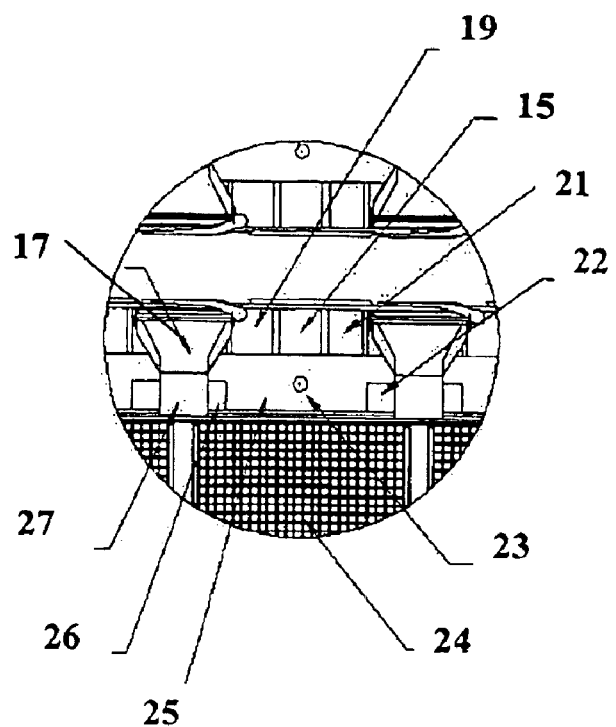
Figure 5:
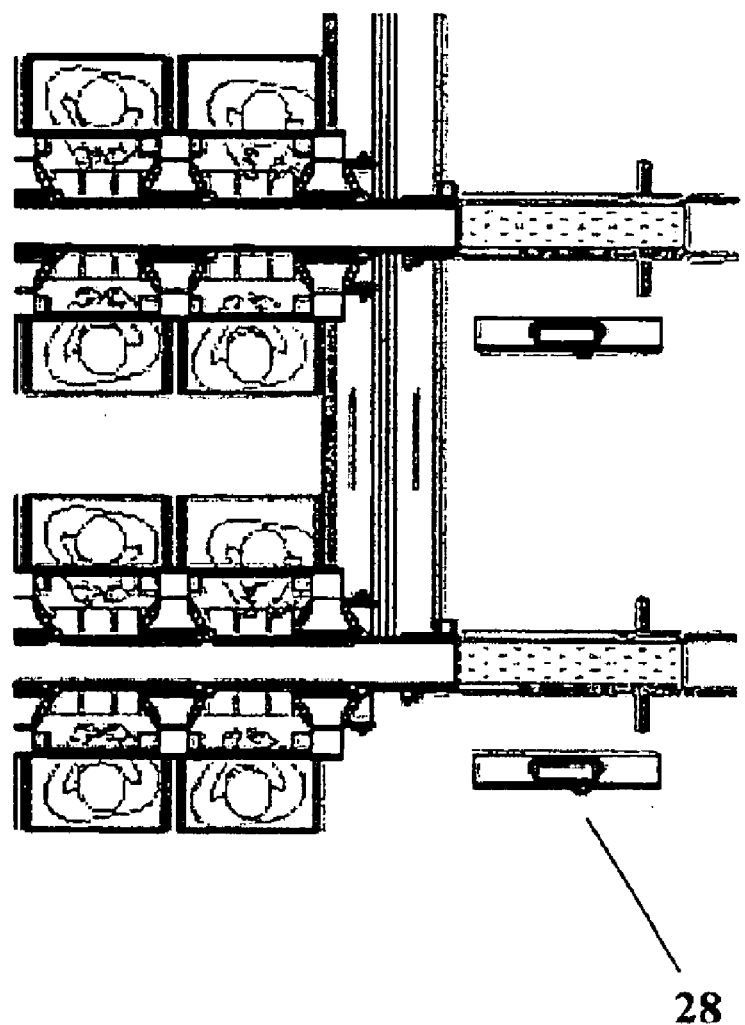
Figure 6:
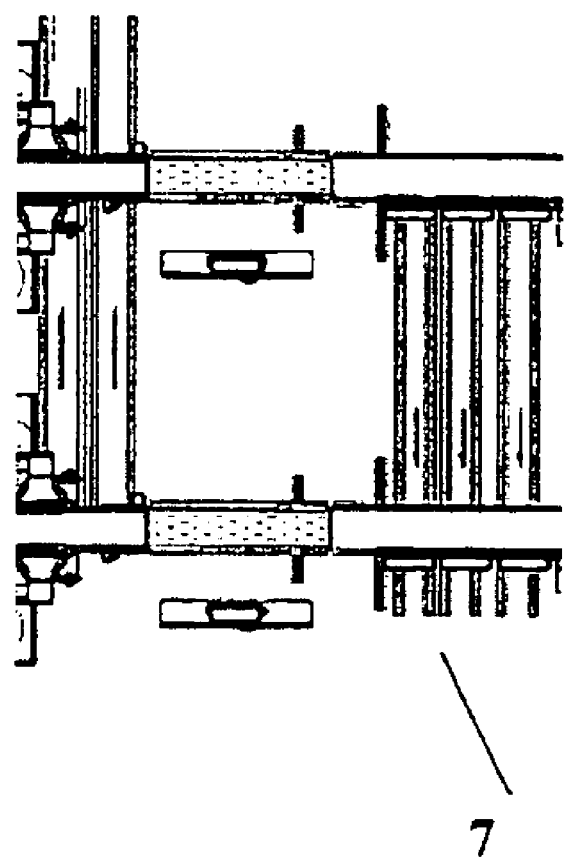
Figure 7:
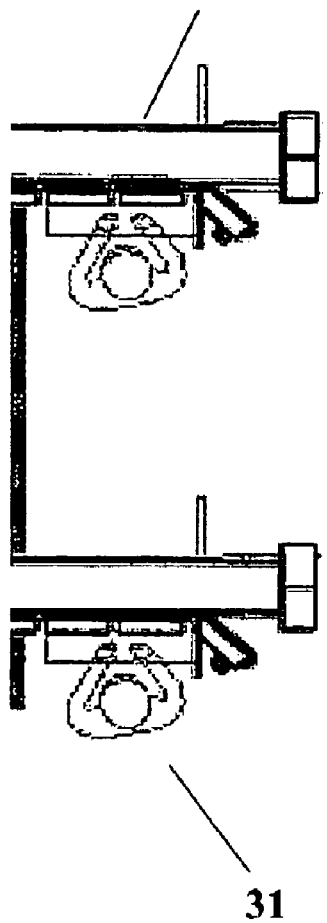

In the following the present invention, and in particular preferred embodiments thereof, will be described in greater details in connection with the accompanying drawings in which FIG. 1 shows an overview over the poultry flow-line system, FIG. 2 shows an overview of a processing stations, FIG. 3 shows a closer view of one processing station, FIG. 4 shows an example of one processing station, FIG. 5 shows the continuation from the processing station where the products are weighed before they are they are sorted, FIG. 6 shows the sorting unit, FIG. 7 shows the quality control station, and FIGS. 8a–8f shows an example how the information in the processing can be extracted and formulated.

FIGS. 9a–9e together depict a flow chart illustrating the method of the present invention of handling poultry items.

FIG. 1 shows one embodiment of a poultry flow-line system according to the present invention. FIGS. 9a–9e are a flow chart showing the steps performed in processing poultry items using the poultry flow line system of the present invention. As shown in FIG. 1 and steps 71–78 of FIG. 9a, the poultry items are delivered from an infeed-station 8 where they are transformed from a bin to a first conveyer 9 where they are kept separated in portions and conveyed in a sequence to a second conveyer belt 10, from which they are divided to third 12 and fourth 1 conveying means, positioned below the second conveyer belt 10. In this embodiment two gutter units are implemented from the second conveyer 10 to the third 12 and fourth 1 conveyers for transferring poultry items from the second conveyer 10 to the third 12 and fourth conveyer 1. Preferably, this is controlled with a gate, through opening and closing the gate (not shown). As stated in step 77 of FIG. 9a, when the gate is closed, the poultry items are transported from the second conveyer 10 to the third conveyer 12, through sliding down the gutter towards a separator (not shown) that generates a sequence of single poultry on the third 12 conveyer. As noted in step 78 of FIG. 9a, a similar procedure occurs from the second conveyer 10 to the fourth conveyer 1. Both the third 12 and fourth 1 conveyer are processing lines with a least one processing station and an operator for processing the poultry items. According to step 79 of FIG. 9b, before assigning the poultry items to a processing station 3 they are weighed 2 and the result sent to a computer system where it is registered and stored. Thereafter, at steps 80 and 83 of FIG. 9b, the poultry items are assigned to a processing station where they are processed. When one processing station is full, the gate to processing station is blocked, as stated in steps 81 and 82, which then prevents further infeed of poultry items. At each processing station the poultry segments are assigned to at least one collecting bin, as stated in step 84, (see FIG. 4, numbers 19, 15, and 21) and information related to the poultry segments are registered and sent to the computer system at steps 85 and 86 of FIG. 9c. After emptying the bins on a removing conveyor (not shown) the poultry segments are conveyed in a sequence where the skin and other waste is throng 4 before the segments are, at steps 85 and 86 of FIG. 9c, counted and weighed 5, where as before the result from the weighing is sent to the computer system and stored. As noted in steps 92 and 93 in FIG. 9d, the weight at the previous weighing station 2 can be compared with the weight at the later weighing station 5, wherein the result can for example be compared with the yield of the poultry item. After weighing the poultry segments, the portion may be sent for the quality control station 6, as noted in steps 94–96 of FIG. 9d and 9e. From the assigning of the poultry items to the processing station and the emptying of the bins at said processing station, the quality of the bins portion can be traced to the operator that processed said poultry item. The result from the quality station is registered with the name of the operator and stored in the computer system at step 96. Finally, the different segments are sorted out 7 and at step 97. The sorting could be based on mixing segments together or separate individual part from the poultry item.

FIG. 2 shows a closer view of the processing stations 3 from FIG. 1, which are situated parallel site by site from the processing lines 1 and 12. The poultry items are weighed 2, 13 before they are assigned to the single processing stations 14. The gate of the processing station transfers the assigned poultry items from the conveying means to the corresponding processing station, where th poultry item is processed and the processed segment is assigned to a predefined bins 15. The number of bins can be different, depending on the processing means. An example would be a bin for the wings, for the breast and for the legs. FIG. 3 shows the processing station in more detailed way. The gate for the assigning of the poultry item to the processing station 16 is shown. A sensor could be integrated to the gate so when the processing station is full and the gate is situated in a position different from its initial position it does not open. This would prevent overload of poultry items at the processing station. FIG. 4 shows one embodiment of a processing station with three bins, one for the wings 19, one for the breast 15 and one for the legs 21. In the bins the number and the weight of the items or individual item can be registered and send to the computer system. Preferably the processing station is provided with a computer (not shown) so that the operator can monitor the number and weight of the segments and get further information regarding the process such as throughput, yield and defects compared to average value and targets. Shown is also the carcass chute 26 and the static deboning cone 23, where the poultry item is processed by means of sticking the deboning cone 23 through the poultry item which ensures stability while processing the product. The height of the working platform 24 in this preferred embodiment is adjustable which provides optimal working condition for each operator at the trimming table 25. Also a chute for the skin 22 is shown. The emptying of the bins on the removing conveyor can be with a fixed frequency, wherein all the bins at the other processing stations are then emptied simultaneously in one portion. This would insure that portions from different processing station do not coincide on the removing conveyor. The bins at one processing station can also be emptied when certain conditions are fulfilled. These conditions could be based on the weight or the number of the segments in the bins. The most important condition that has to be fulfilled is that the conveyor has enough space to receive the portion from the bins, i.e. so that the portion does not mix with portions from other processing stations. This is of crucial importance, not only for the sorting at the later stage but also in order to be able to trace the processed segments to the processing station and therefore the operator. The "right timing" is therefore based on when bins from the other processing station were emptied and also on the speed on the conveyor belt. When the bins are emptied simultaneously they lie in a sequence on the removing conveyor, which is necessary for the sorting which takes at a later time.

FIG. 5 shows the continuation from the processing station where the products are weighed before they are sorted into for example wings, breasts and legs 7 as shown in FIG. 6. and/or send to the quality control station 31 as FIG. 7 shows. The result from the weighing and the quality control are registered and send to the computer system.

Figure 8A:
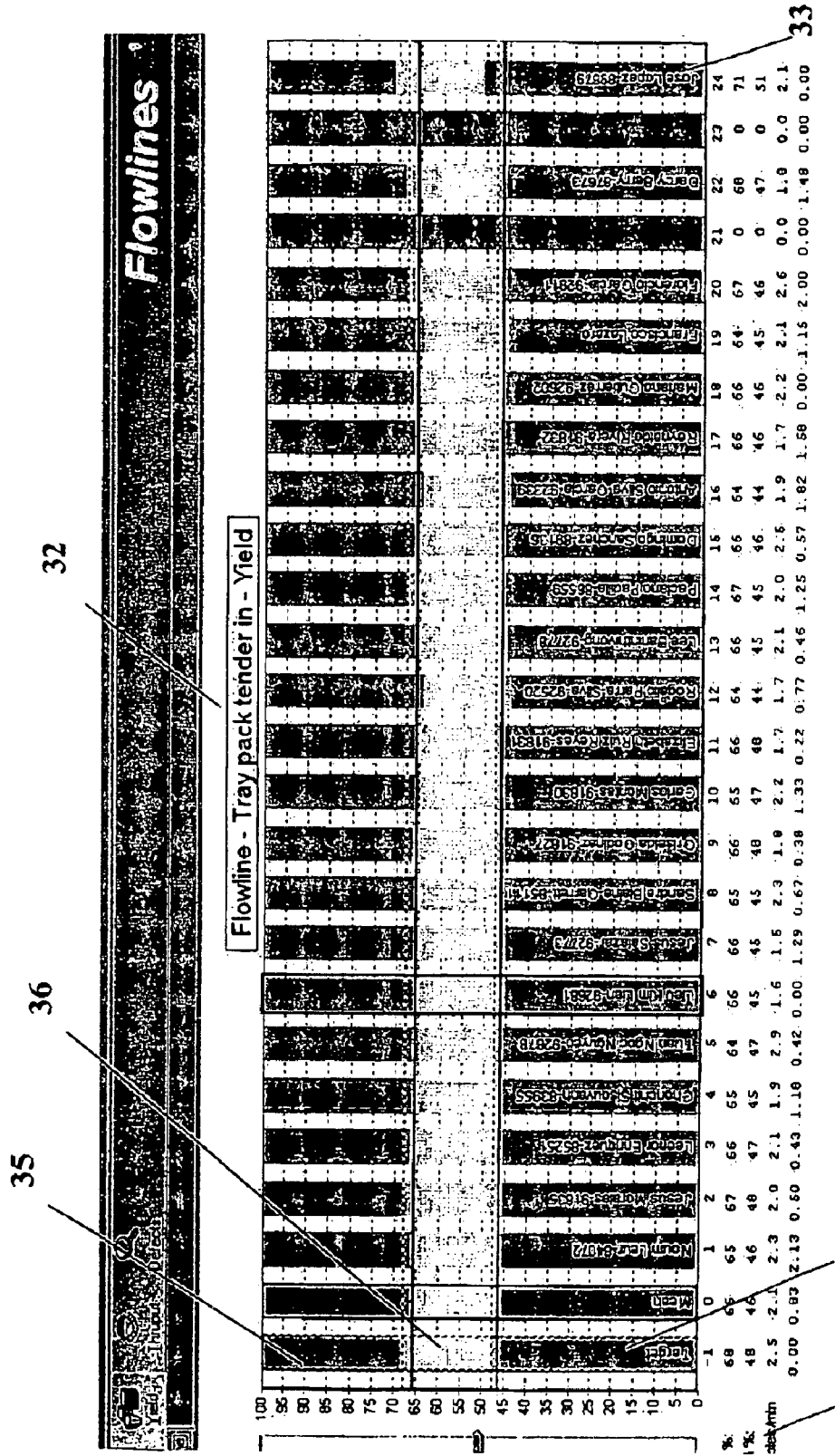
Figure 8:
Figure 8:
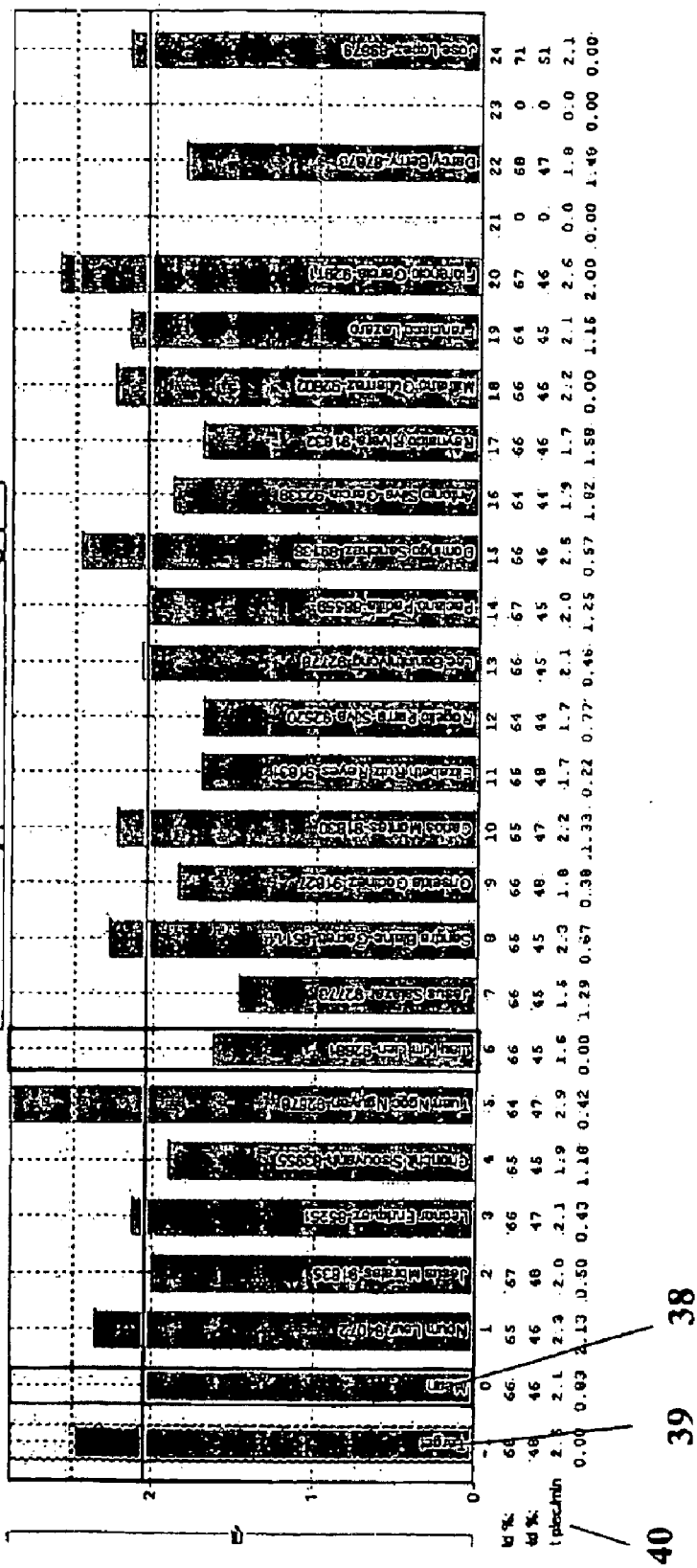
Figure 8C:
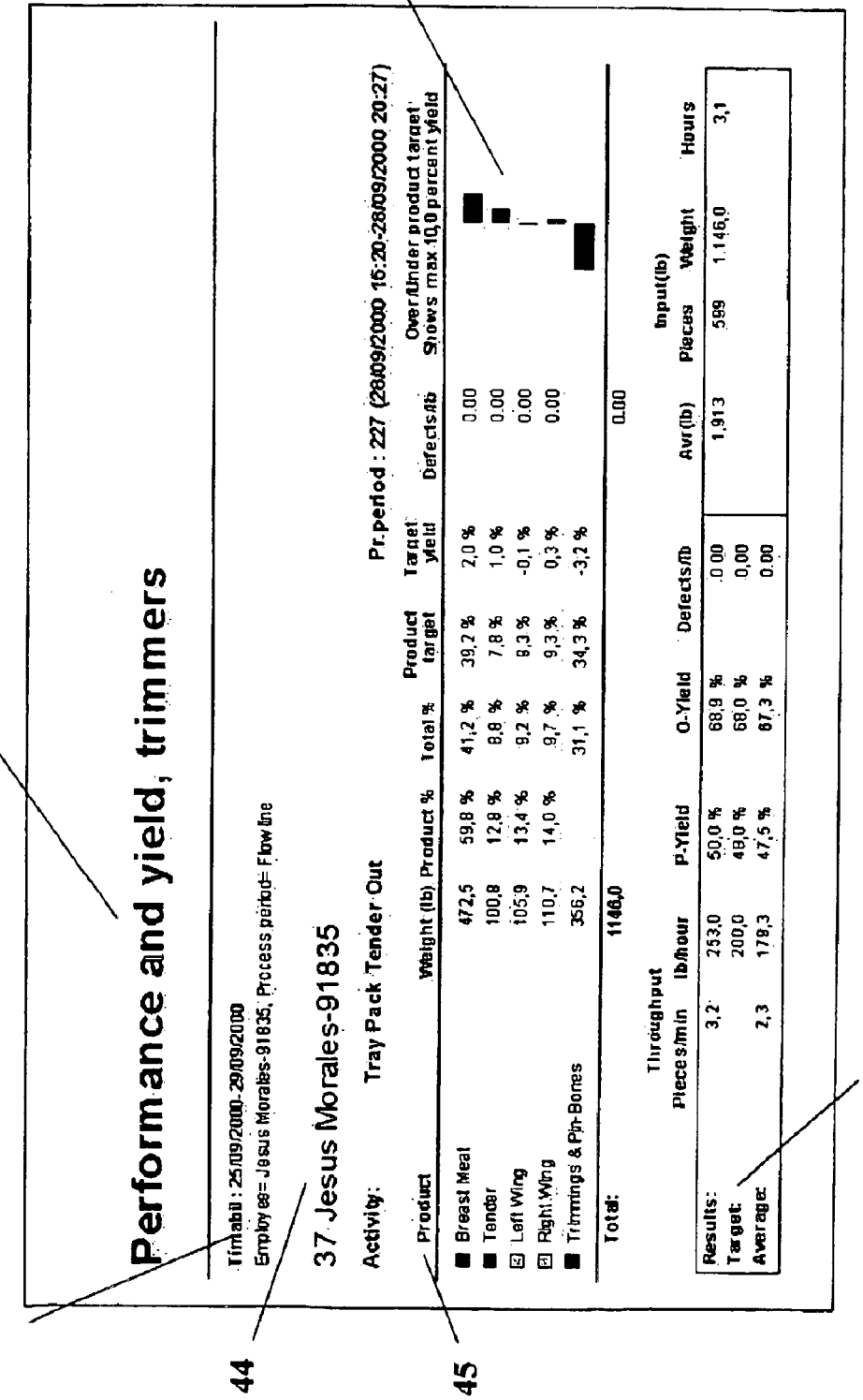
Figure 8:
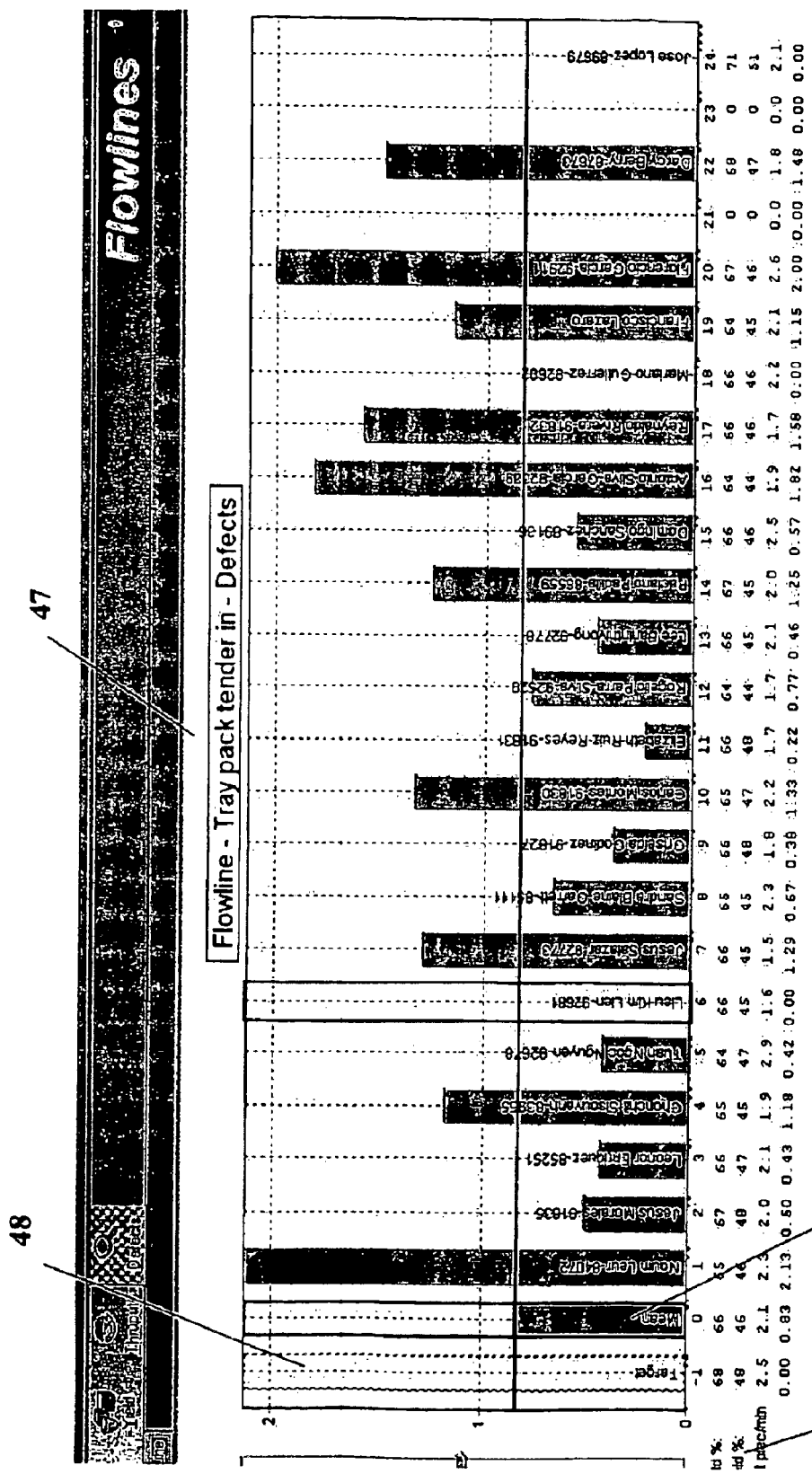
Figure 8:
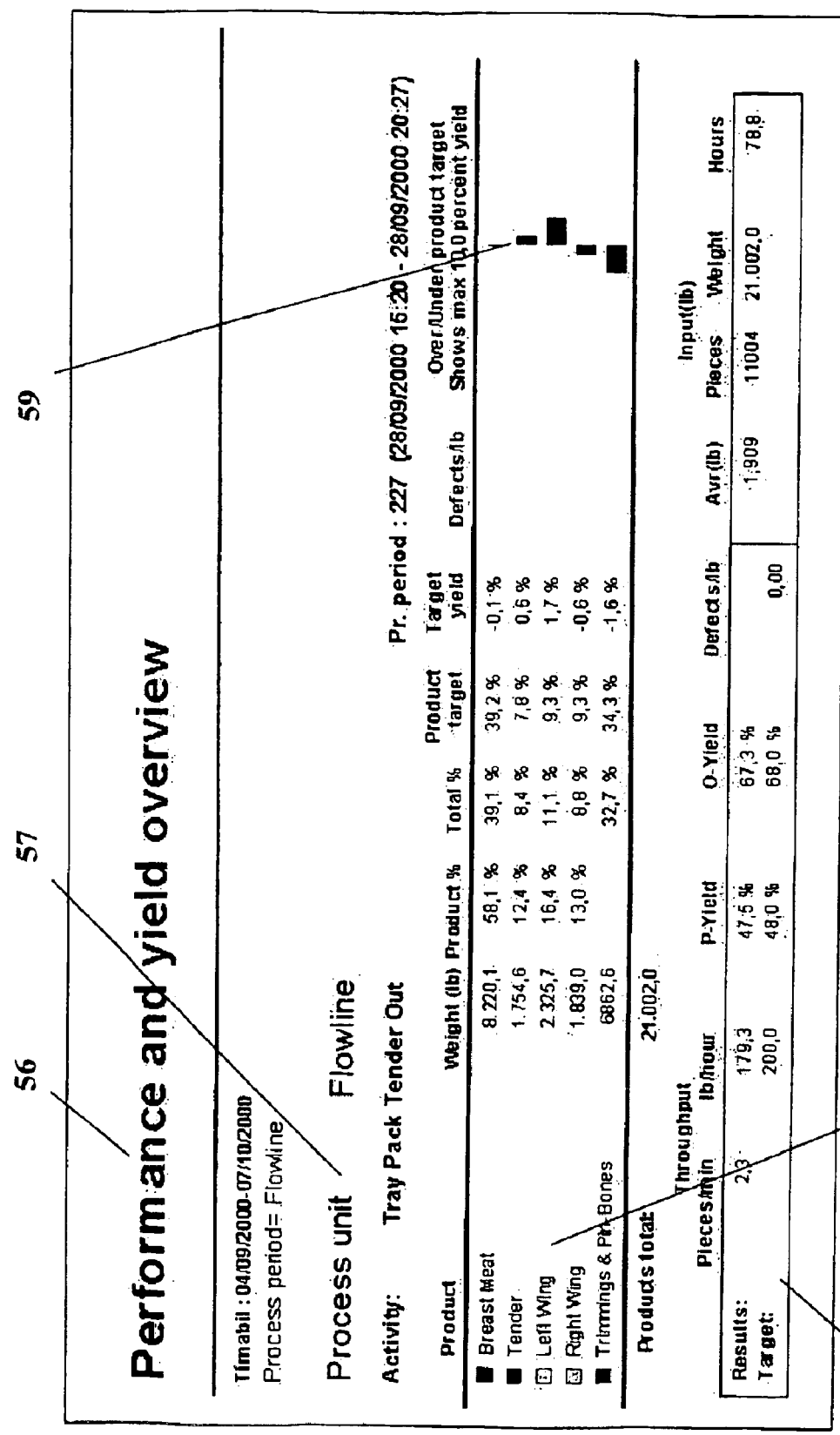
Figure 9A:
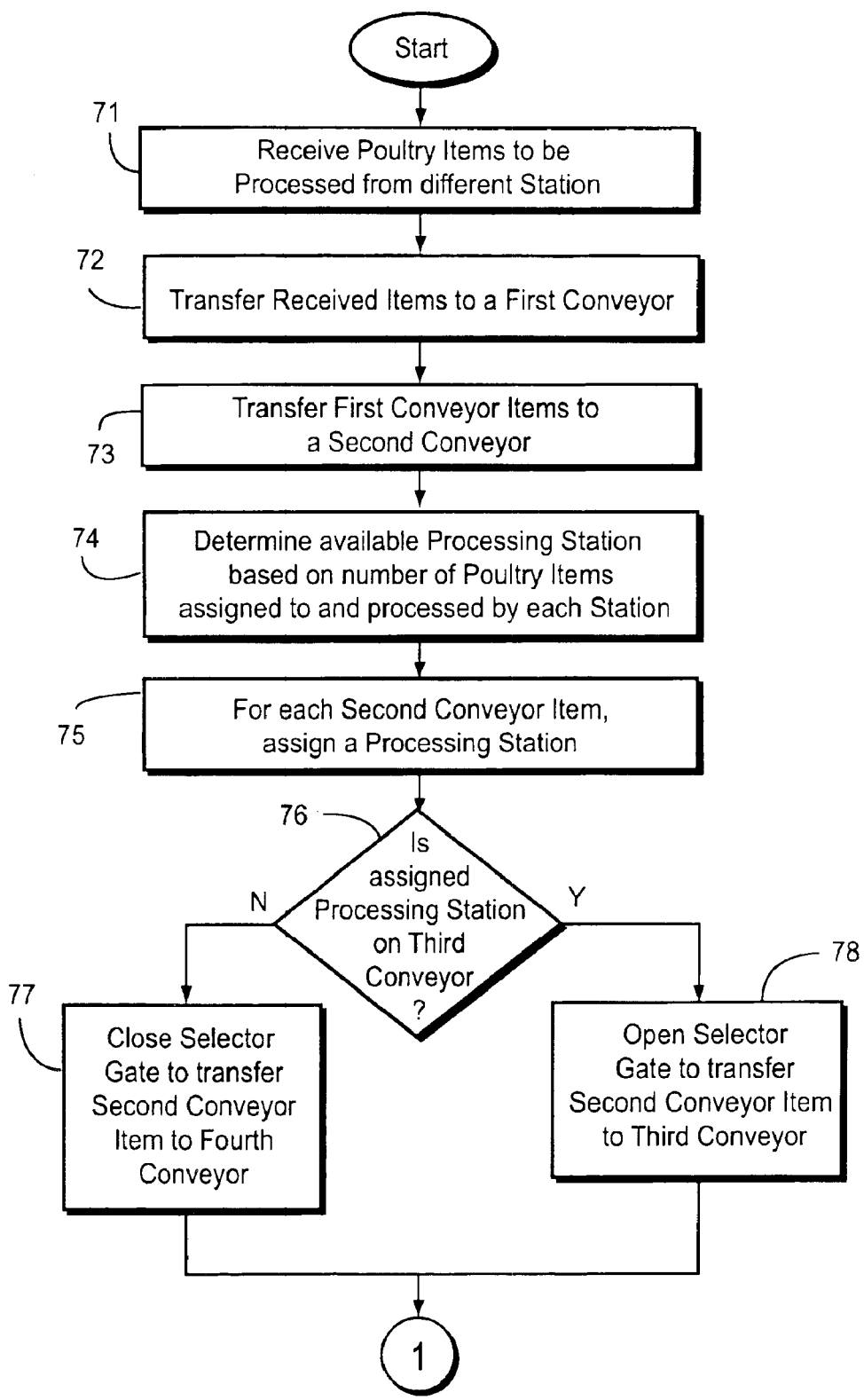
Figure 9B:
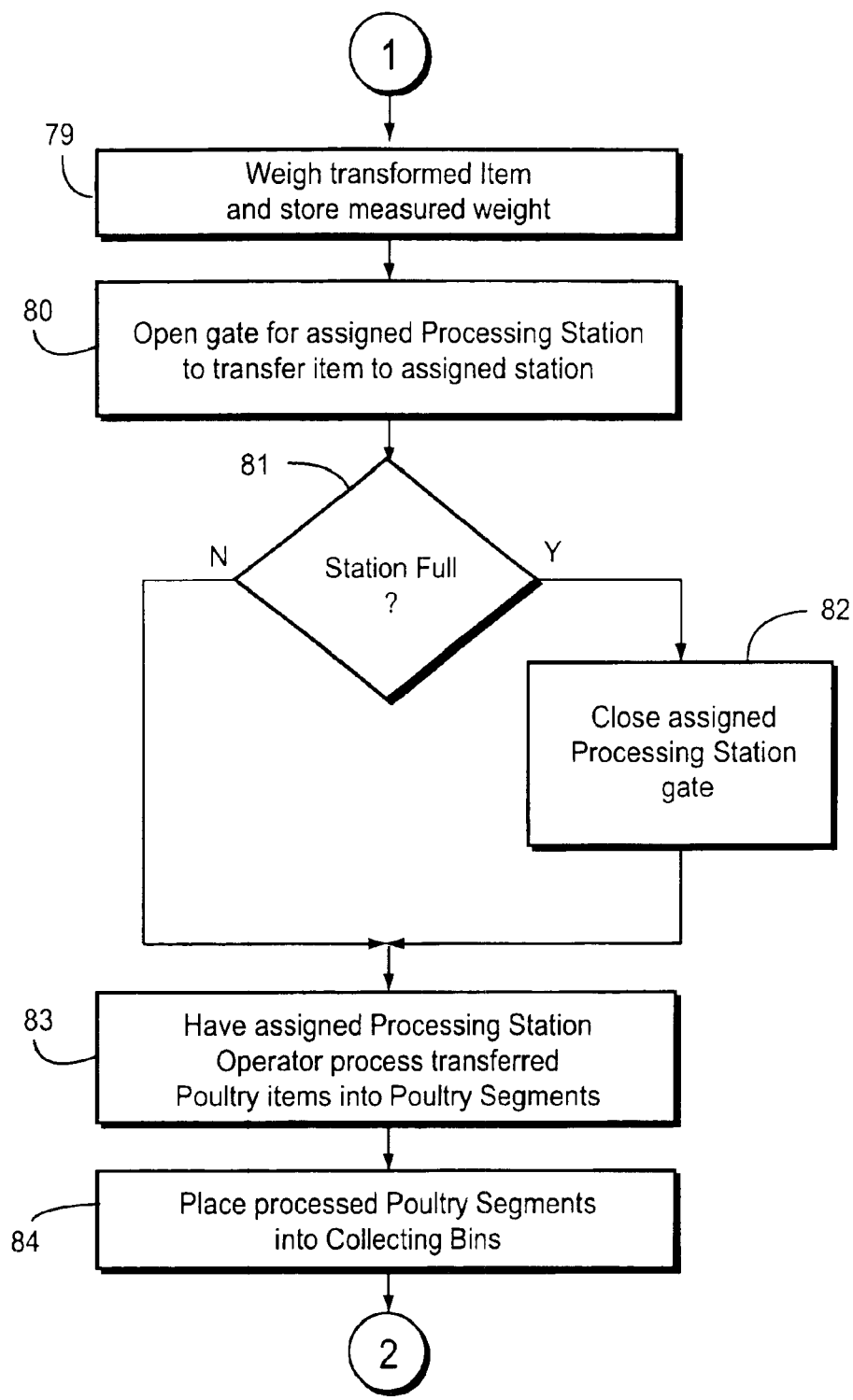
Figure 9C:
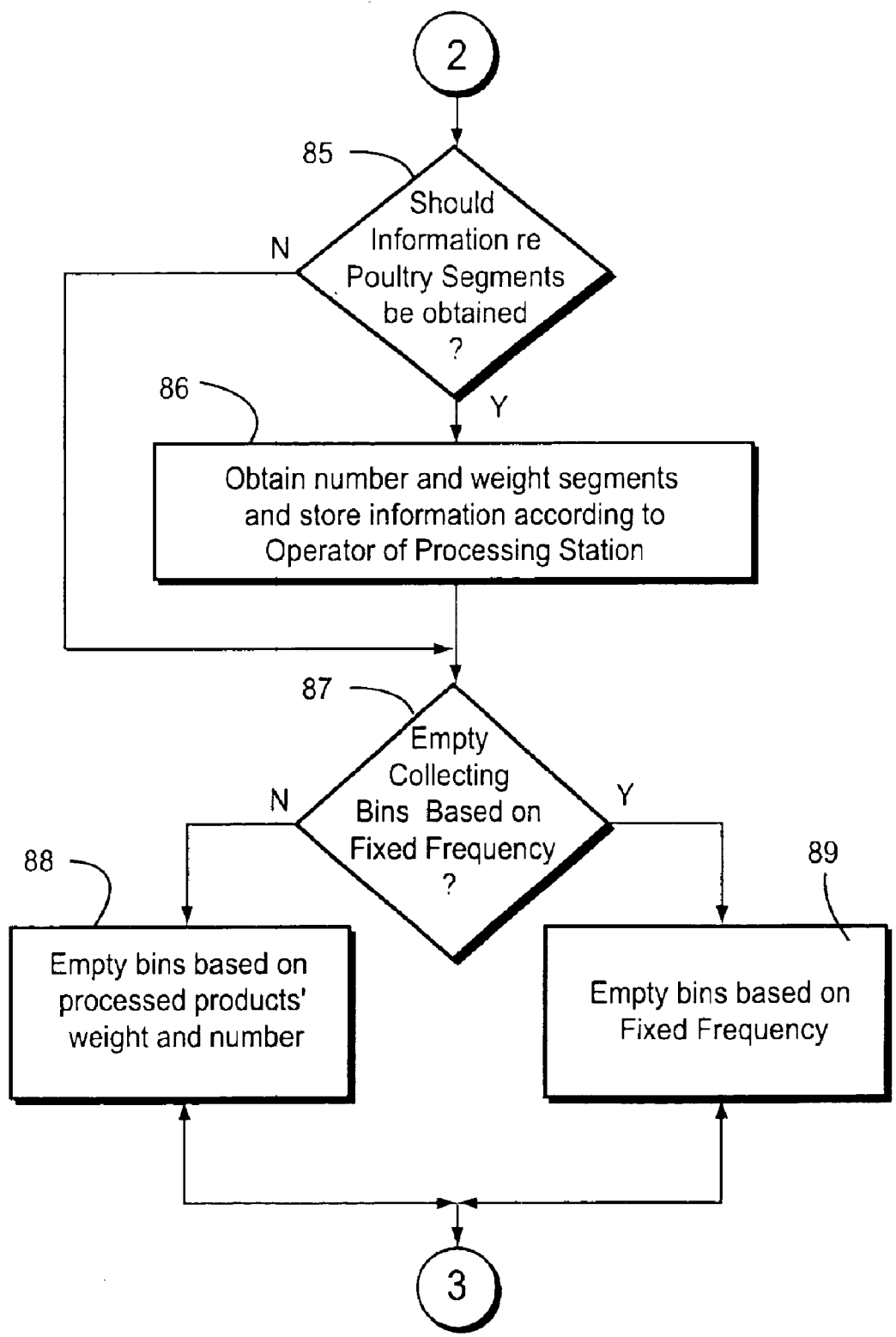
Figure 9D:
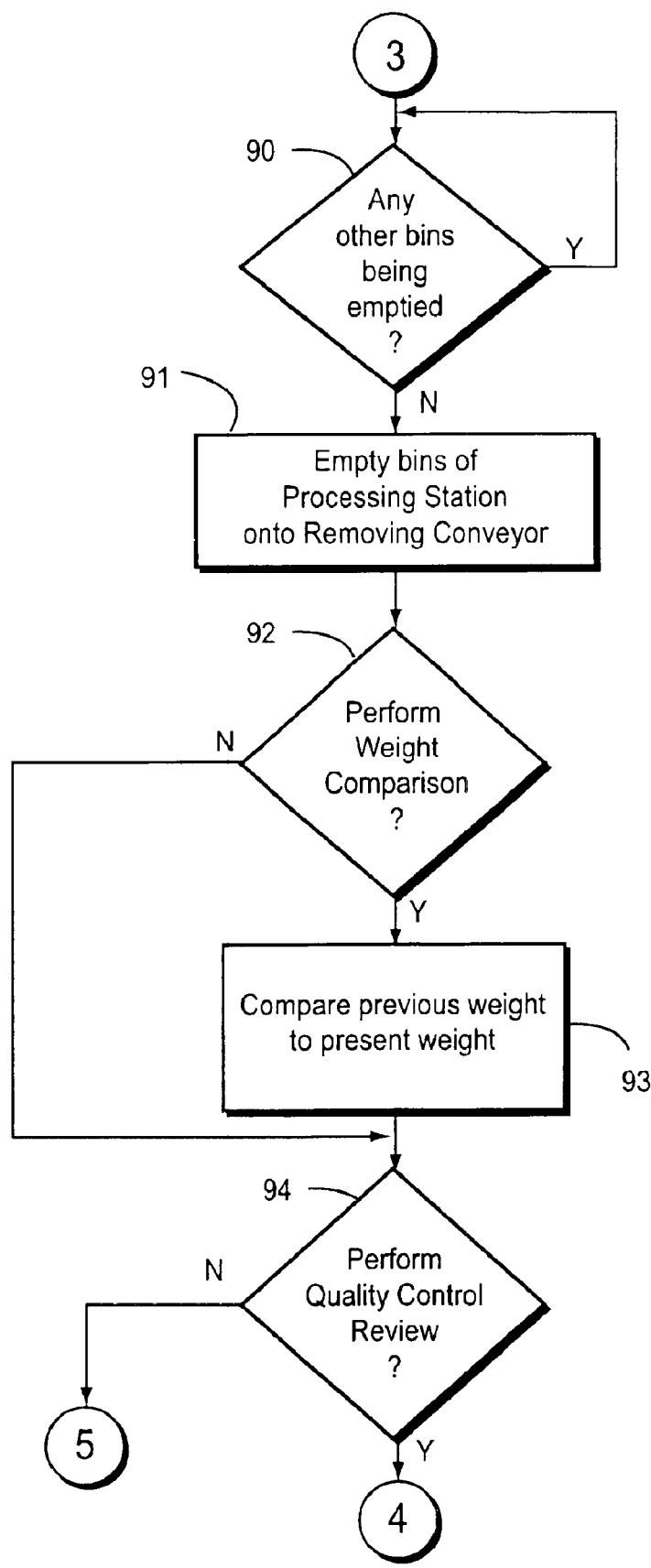
Figure 9E:
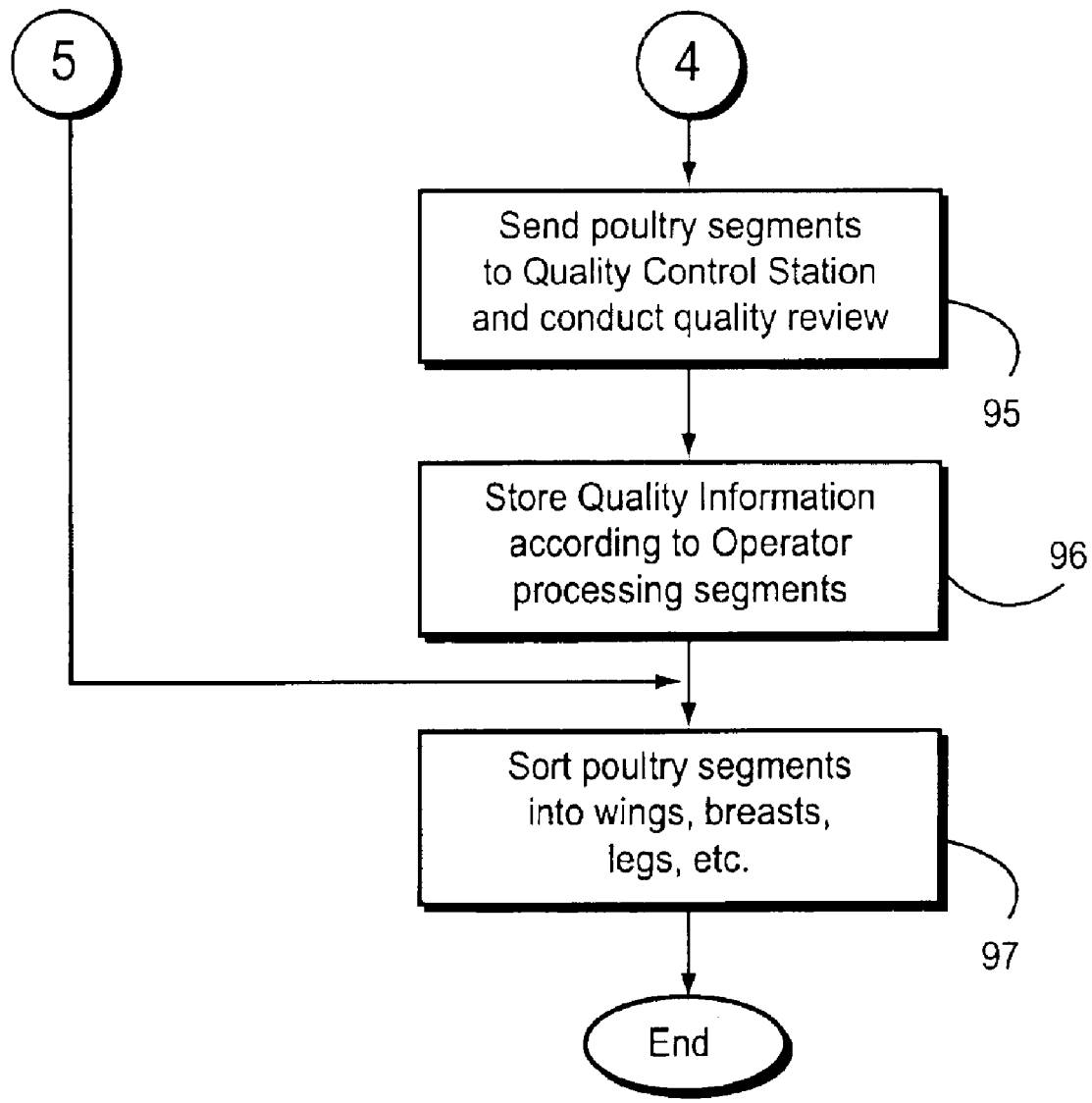

FIGS. 8a–8j shows an example of how the information obtained during the processing can be extracted and formulated. In FIG. 8a, the target weight is shown, wherein the whole column is the whole poultry item, the lower part of the column is the breast fillet 34, the middle part the legs and wings 36 and the upper part the rests such as the skin and bones 35. The proper percentage numbers are listed out 37. From the information obtained from the processing station, i.e. for example the number of processed poultry items for a given period of time, the throughput 37 can be calculated as FIG. 8b shows. The histogram shows the throughput for different operators for a given period of time. From the total number of processed items in the time interval the mean throughput 38 can be calculated and compared with individual operator. In FIG. 8b the throughput per minute 40 is shown. FIG. 8c shows an overview example for an operator 44, where the performance and the yield 41 for a given timer period 42 are formulated. The products 45 and information related to the product such as the weight, product target and the target yield are shown. Histogram where the processed weight of the products is compared with the target weight is also shown 43. In this overview the result regarding for example the number of items processed per minute and the manhours are also shown. The number of defects 47 is also monitored in the processing at the quality control station where the result can be traced to the operator and the processing station where the items was processed. An example of such overview is shown in FIG. 8d, where a predefined scale is used and in relation with the scale the result for different operators is presented. The mean value 49 is calculated and compared with individual operators. All line details 51 are presented In FIG. 8e for a given time period 52, where for example the weight, number of segments and the number of pieces pro minute 55 are shown for each operator 53. The total result for the flow-line system can therefore be calculated 54. The performance and yield overview for the flow-line 57 is shown in FIG. 8f, where similar as in FIG. 8c, the products 58 and the histogram for the processed weight of the products is compared with the target weight is for the flow-line is shown 59. The result such as number of pieces per minute and the man-hours for the flow-line system are also shown 60.

What is claimed is:

1. An integrated processing and information handling method for poultry items, the method comprising the steps of:

receiving poultry items to be processed from an in-feed conveying means, assigning the poultry items to at least one processing station and transferring the assigned poultry items from the in-feed conveying means to said at least one assigned processing station, processing the poultry items into poultry segments by a processing operator assigned to the processing station and placing the poultry segments to at least one collecting bin provided at each of said at least one processing station and optionally obtaining at least a first information related to the poultry segments, transferring the poultry segments from the at least one bin to a take-away conveying means, whereby the position of each of the poultry segments on the take-away conveying means is not mixed with the positions of other poultry segments on the take-away conveying means, obtaining at least a second information comprising the weight and/or quality of the poultry segments and storing the information in a computer system, and utilizing the positions of the poultry segments on the take-away conveying means for tracing the poultry segments to the processing station or processing stations from which the poultry segments originate and associating said information to said processing station or processing stations, wherein by utilizing the tracing for associating said information to the processing station or processing stations the processing is monitored.

2. A method according to claim 1, further comprising means for weighing the poultry items prior to assigning the poultry items to at least one processing station.

3. A method according to claim 1, wherein after transferring the poultry segments from the at least one bin to the take away conveying means at least a part of the poultry segments are conveyed to a quality control station for analysing the poultry segments with respect to quality such as miscuts and/or bones and/or cartilage and wherein the result is sent to a computer system.

4. A method according to claim 1, wherein the in-feed and the take-away conveying means is a one conveying unit.

5. A method according to claim 1, further comprising means for weighing the poultry segments in said at least one bin and wherein the information is sent to the computer systems.

6. A method according to claim 1, further comprising means for determining the number of processed poultry segments in said at least one bin and wherein the information is sent to the computer systems.

7. A method according to claim 1, wherein said at least a first information comprises the weight of the poultry items prior to assigning the poultry items to at least one processing station and/or the weight of the poultry segments in said at least one bin and/or the number of poultry segments in said at least one bin.

8. A method according to claim 1, further comprising means for weighing the poultry segments on the take-away conveying means and wherein the information is sent to the computer systems.

9. A method according to claim 1, wherein said at least a second information comprises the weight and/or quality of poultry segments on the take-away conveying means.

10. A method according to claim 1, further comprising means for monitoring at least one of said information during the processing.

11. A method according to claim 1, wherein placing the poultry segments in said at least one collecting bin comprises sorting the poultry segments from the same parts of the poultry items into said at least one bin.

12. A method according to claim 1, wherein the criteria for transferring the content of said at least one bin to the take-away conveying means is based on a predefined number of poultry segments in said at least one bins.

13. A method according to claims 1, wherein the criteria for transferring the content of said at least one bin to the take-away conveying means is based on a predefined weight of the poultry segments in said at least one bin.

14. A method according to claim 1, wherein the criteria for transferring the content of said at least one bin to the take-away conveying means is based on monitoring the poultry segments that are being conveyed on the take-away conveying means such that the transferred poultry segments do not coincide with said segments that are being conveyed with said take-away conveying means.

15. A method according claim 1, wherein the transferring the content of said at least one bin to the take-away conveying means is based on transferring the content at fixed frequency.

16. A method according claim 1, wherein the computer system is adapted to send information relating to the processing to the processing stations.

17. A method according claim 1, wherein processing the poultry items at the processing stations comprises segmenting the poultry item into at least two parts.

18. A method according claim 1, wherein said at least a second and optionally said at least a first information are utilized in determining the system performance.

19. A method according claim 1, wherein the performance is based on the number of processed poultry items and/or the number of defects and/or the yield.

20. A method according claim 1, wherein the processing operator can monitor the number of processed poultry items and/or number of defects and/or the yield and/or the performance and/or the quality of the processing at the processing station during the processing.

21. A method according claim 1, wherein the processing operator is registered at the processing station prior to the processing and wherein the registration is sent to the computer systems that identifies the operator.

22. An integrated processing and information handling system for poultry items comprising:

an in-feed conveying means for conveying poultry items to be processed, means for assigning the poultry items to a processing station and transferring the assigned poultry items from the conveying means to the assigned processing station, at least one bin for receiving the poultry segments, a mechanism for releasing the poultry segments from the at least one bin on a take away conveying means, which conveys the poultry segments from the at least one bin and wherein the position of each of the poultry segments is not mixed with the positions of other poultry segments on the take away conveying means, at least one detecting means for obtaining at least one information related to the poultry segments and optionally the poultry items, a computer system for storing and processing the information, and means utilizing the positions of the poultry segments on the take away conveying means for tracing the poultry segments to the processing station or processing stations from which the poultry segments originate and for associating the at least one information to the transferred poultry segments and thereby monitoring the processing.

* * * * *